US009193309B2

(12) United States Patent
Toyama et al.

(10) Patent No.: US 9,193,309 B2
(45) Date of Patent: Nov. 24, 2015

(54) VEHICULAR HANDLE

(71) Applicant: Alpha Corporation, Yokohama-shi, Kanagawa (JP)

(72) Inventors: Takao Toyama, Yokohama (JP); Naoki Sato, Yokohama (JP); Shuichi Kudoh, Yokohama (JP)

(73) Assignee: Alpha Corporation, Kanagawa (JP)

( * ) Notice: Subject to any disclaimer, the term of this patent is extended or adjusted under 35 U.S.C. 154(b) by 0 days.

(21) Appl. No.: 14/383,116

(22) PCT Filed: Mar. 26, 2013

(86) PCT No.: PCT/JP2013/058671
§ 371 (c)(1),
(2) Date: Sep. 5, 2014

(87) PCT Pub. No.: WO2013/161482
PCT Pub. Date: Oct. 31, 2013

(65) Prior Publication Data
US 2015/0074943 A1 Mar. 19, 2015

(30) Foreign Application Priority Data
Apr. 27, 2012 (JP) ................................. 2012-103550

(51) Int. Cl.
*B60R 13/00* (2006.01)
*E05B 85/10* (2014.01)
(Continued)

(52) U.S. Cl.
CPC . *B60R 13/00* (2013.01); *E05B 7/00* (2013.01); *E05B 85/10* (2013.01); *E05B 85/16* (2013.01); *Y10T 16/458* (2015.01)

(58) Field of Classification Search
CPC ....... Y10T 16/44; Y10T 16/458; E05B 17/10; E05B 81/76; E05B 85/10; E05B 85/16; E05B 7/00; E05Y 2900/531; B60Q 1/2669; B60J 5/04; B60R 13/00
USPC ............... 16/110.1, 412; 292/336.3; 362/501; 296/146.1
See application file for complete search history.

(56) References Cited

U.S. PATENT DOCUMENTS

2006/0282987 A1* 12/2006 Shih et al. ........................ 16/412
2007/0091627 A1* 4/2007 Nitawaki et al. ............... 362/501
(Continued)

FOREIGN PATENT DOCUMENTS

| JP | 58-14759 U | 1/1983 |
| JP | 2008-202231 A | 9/2008 |

(Continued)

OTHER PUBLICATIONS

Official Communication issued in International Patent Application No. PCT/JP2013/058671, mailed on May 21, 2013.

*Primary Examiner* — William Miller
(74) *Attorney, Agent, or Firm* — Keating and Bennett, LLP

(57) ABSTRACT

An object of the present invention is to provide a vehicular handle having good characteristics in attachment of a decorative cover and also eliminating the likelihood of the occurrence of a failure in the attachment. Provided is a vehicular handle including: a handle body 1 attached to a vehicle; and a decorative cover 5 including a main body portion 2 which is long in a longitudinal direction of the handle body 1, and lock portions 3, 4 formed on both ends of the main body portion 2, the decorative cover 5 attached to a surface of the handle body 1 with the locking portions 3, 4 locked to the handle body 1, in which the decorative cover 5 is attached by turning the main body portion 2 with one of the locking portions 3, 4 acting as a turning fulcrum, and thereby resiliently locking the other locking portion 3, 4 to the handle body 1.

10 Claims, 4 Drawing Sheets

(51) Int. Cl.
*E05B 85/16* (2014.01)
*E05B 7/00* (2006.01)

(56) References Cited

U.S. PATENT DOCUMENTS

2007/0263401 A1* 11/2007 Shi ............................... 362/501
2011/0170305 A1   7/2011 Tanaka et al.
2014/0310916 A1* 10/2014 Shimizu et al. ................. 16/412
2014/0366326 A1* 12/2014 Colombo et al. ............... 16/412

FOREIGN PATENT DOCUMENTS

| JP | 2010-229797 A | 10/2010 |
| JP | 2011-140181 A | 7/2011 |

* cited by examiner (a)

(b)

VEHICULAR HANDLE

TECHNICAL FIELD

The present invention relates to a vehicular handle.

BACKGROUND ART

A handle disclosed in Patent Document 1 has been known as a handle including a decorative cover attached to a surface portion of a handle body. In this conventional example, attachment of an elastic decorative plate (or the decorative cover) to a pull handle body (or a handle body) is accomplished by inserting both ends of the decorative plate into engagement lateral holes of the handle body while largely warping the overall decorative plate.

PRIOR ART DOCUMENT

Patent Document

Patent Document 1: Japanese Examined Utility Model Publication No. Sho 58-14759

SUMMARY OF THE INVENTION

Problems to be Solved by the Invention

However, the above-mentioned conventional example has the problem of being prone to cause a fracture in the decorative cover, a break in a surface treatment layer such as plating given to a surface of the decorative cover, or the like, because the overall decorative cover needs to be warped largely.

The present invention has been made in order to eliminate the foregoing drawback. An object of the present invention is to provide a vehicular handle having good characteristics in attachment of a decorative cover and also eliminating the likelihood of the occurrence of a failure in the attachment.

Means for Solving the Problem

According to the present invention, the above object is attained by providing a vehicular handle including: a handle body 1 attached to a vehicle; and a decorative cover 5 including a main body portion 2 which is long in a longitudinal direction of the handle body 1, and locking portions 3, 4 formed on both ends of the main body portion 2, the decorative cover 5 attached to a surface of the handle body 1 with the locking portions 3, 4 locked to the handle body 1, in which the decorative cover 5 is attached by turning the main body portion 2 with the one locking portion 4 acting as a turning fulcrum, and thereby resiliently locking the other locking portion 3 to the handle body 1.

In the present invention, attachment of the decorative cover 5 is accomplished by turning the main body portion 2 around the locking portion 4 formed on one end of the main body portion 2, with the locking portion 4 locked to the handle body 1, and locking the locking portion 3 formed on the other end of the main body portion 2 to a locked portion 8 of the handle body 1 by thus turning the main body portion 2.

In a case of using a process in which the overall decorative cover 5 is temporarily warped for attachment to the handle body 1, the amount of warping required for locking cannot be determined beforehand, and thus, the decorative cover 5 may be excessively warped and hence suffer damage or the like; however, use of a mounting method in which the other end portion is locked with the turning operation performed with the one end acting as the turning fulcrum allows an assembly operator to perform the operation without excessively deforming the decorative cover 5, thus enabling an improvement in assembly efficiency and, moreover, reducing the likelihood of the occurrence of a failure.

Also, the vehicular handle may be configured as the vehicular handle including an electronic component 6 fixed to the handle body 1, in which the electronic component 6 is provided with a movement restraining portion 7 which restrains movement of at least one of the locking portions 3, 4 of the decorative cover 5.

In the present invention in which movement of the decorative cover 5 locked to the handle body 1 is finally restrained by the movement restraining portion 7 formed on the electronic component 6, high mounting strength can be achieved even if a locking dimension is set small. As a result, the amount of warping of the decorative cover 5 for resilient locking can be reduced, and thus, the decorative cover 5 can be prevented from becoming harmfully deformed or damaged due to an excessively high load on the decorative cover 5 during the resilient locking, and moreover, the decorative cover 5 can be prevented with reliability from being carelessly removed or mischievously or otherwise removed.

The electronic component 6 includes a lighting device, a control button, and the like.

Also, the movement restraining portion 7 may be configured to restrain turning movement of the decorative cover 5 by constraining a turning fulcrum end of the decorative cover 5. Thereby, if an attempt is made to displace the locking portion 3 on the turning tip end side toward the turning fulcrum to unlock the locking portion 3, the decorative cover 5 is restrained from turning by the movement restraining portion 7, thus rendering it difficult to perform unlocking by turning the decorative cover 5. As a result, the unlocking requires an operating force sufficient to cause buckling deformation in the decorative cover 5, which in turn renders it difficult to mischievously or otherwise perform improper unlocking operation.

Locking of the locking portions 3, 4 to the locked portions 8 can also be accomplished by any of the locking portions 3, 4 and the locked portions 8 undergoing elastic deformation to shift to their locked position; however, when warping of the main body portion 2 is utilized for a shift to the locked position, the decorative cover 5 is long, and thus the amount of displacement of the locked portion can be large even if the amount of warping of each portion is small, and therefore, locking operation can be performed without causing the occurrence of an excessively high stress on each portion.

In this case, the vehicular handle may be configured as the vehicular handle in which at least one of the locking portion 3 on the turning tip end side and the locked portion 8 formed on the handle body 1 and locked by the locking portion 3 is formed to have an inclined surface 9 producing a component force in a direction of warping of the main body portion 2 when the locking portion 3 is pressed into the locked portion 8. Thereby, attachment operation is accomplished merely by turning the main body portion 2 and then pressing the other locking portion 3 toward the handle body 1, and thus, attachment workability is improved.

Effect of the Invention

According to the present invention, it is possible to achieve good characteristics in attachment of a decorative cover and also eliminate the likelihood of the occurrence of a failure in the attachment.

MODE FOR CARRYING OUT THE INVENTION

Figure 1:
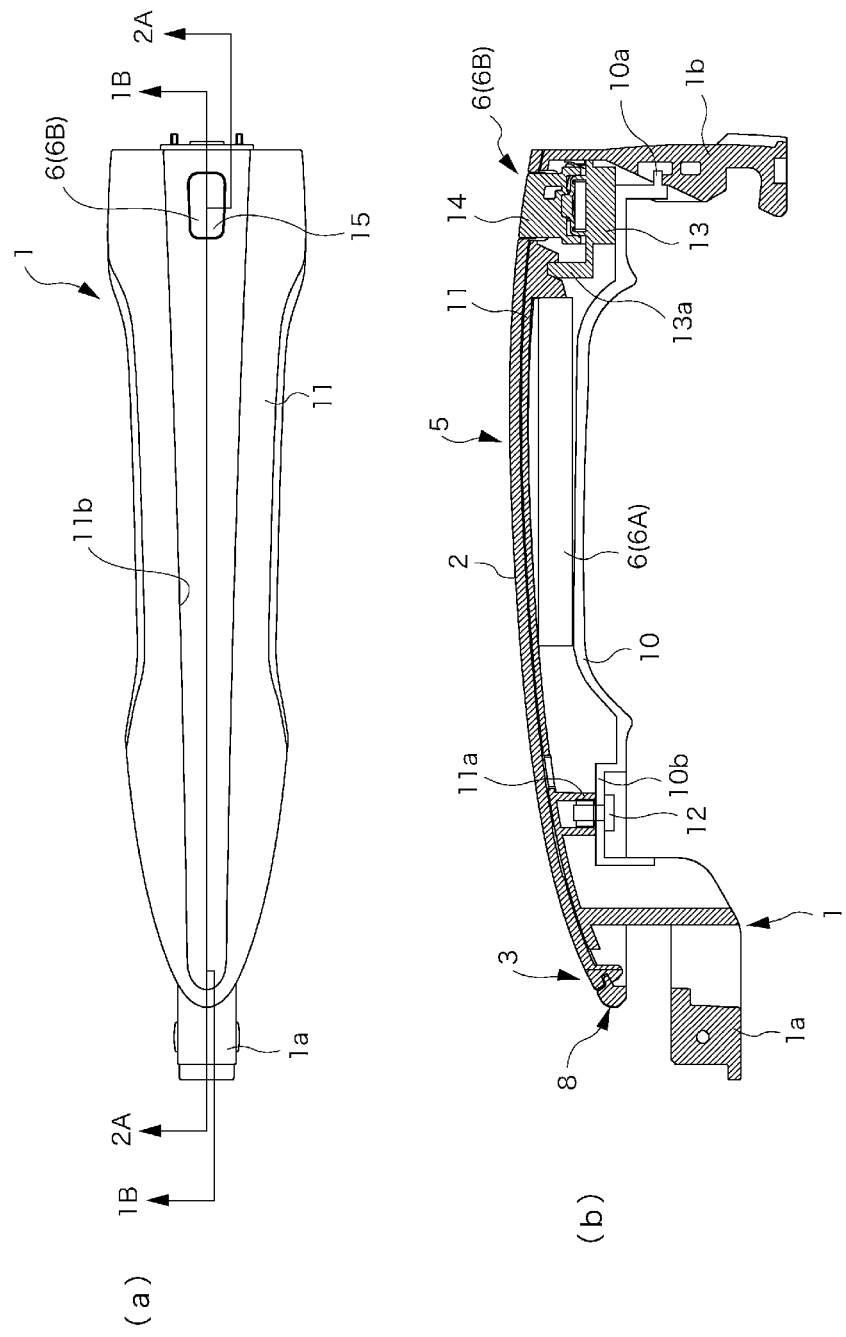
FIG. 1 is a view illustrating the present invention, Part (a) is a front view, and Part (b) is a cross-sectional view taken along line 1B-1B of Part (a).

FIG. 1 and the following figures illustrate an embodiment of the present invention. A vehicular handle of the embodiment is used with a hinge protrusion portion 1a rotatably linked to a handle base (not illustrated) fixed to a door of a vehicle, and displacement of an actuation leg 1b formed on the other end, at the time of rotational operation around a portion of linkage to the handle base, is transmitted to a door lock device (not illustrated) in the door thereby to operate the door lock device.

The handle includes a handle body 1, a decorative cover 5 for decorating a surface of the handle body 1, and an electronic component 6 fixed to the handle body 1.

The handle body 1 is formed in a hollow shape by linking an upper side cover 11 to an underside cover 10. Linkage of the upper side cover 11 to the underside cover 10 is accomplished by locking an insertion piece 10a formed in a rear end portion of the underside cover 10 to the upper side cover 11, and screwing a fixing piece 10b of a front end portion into an embedded nut 11a of the upper side cover 11. (Hereinafter, for explanation of positions, the left-hand part of FIG. 1 will be described as "front," and the upper part of Part (b) of FIG. 1 will be described as "upper side.") Incidentally, in Part (b) of FIG. 1, reference numeral 12 denotes a fixing screw screwed into the embedded nut.

In the embodiment, an antenna unit 6A and a push switch 6B are incorporated as the electronic component 6, and are led out of the handle body 1 via a lead wire (not illustrated) and then connected to a control device such as a vehicle-mounted computer mounted on the vehicle.

As illustrated in Part (b) of FIG. 1, the push switch 6B is formed by accommodating a contact point portion (not illustrated) in a switch case 13, and is configured as what is called a push button switch which connects or disconnects the contact point portion by press-down operation of a push button 14 attached to a head portion. The switch case 13 is provided with a positioning protrusion 13a, and is positioned at a predetermined position by fitting the positioning protrusion 13a to the upper side cover 11.

The push switch 6B is used as a lock button; specifically, when the push switch 6B is operated by being pressed down, the control device communicates with a portable type electronic key carried by a user via an antenna (to be described later) to obtain authentication code outputted by the portable type electronic key, and the door is switched to its locked state if the obtained authentication code is authenticated.

Also, the antenna unit 6A includes an electrode of an electrostatic sensor and the antenna, and is fixed at a predetermined position in such a way as to be sandwiched in between the underside cover 10 and the upper side cover 11. The electrostatic sensor can detect the user gripping the handle body 1; specifically, when the electrostatic sensor senses the user's gripping motion, a procedure for obtaining the authentication code is performed in the same manner as the above-mentioned push switch 6B, and the door is switched to its unlocked state if the obtained authentication code is authenticated.

Figure 3:
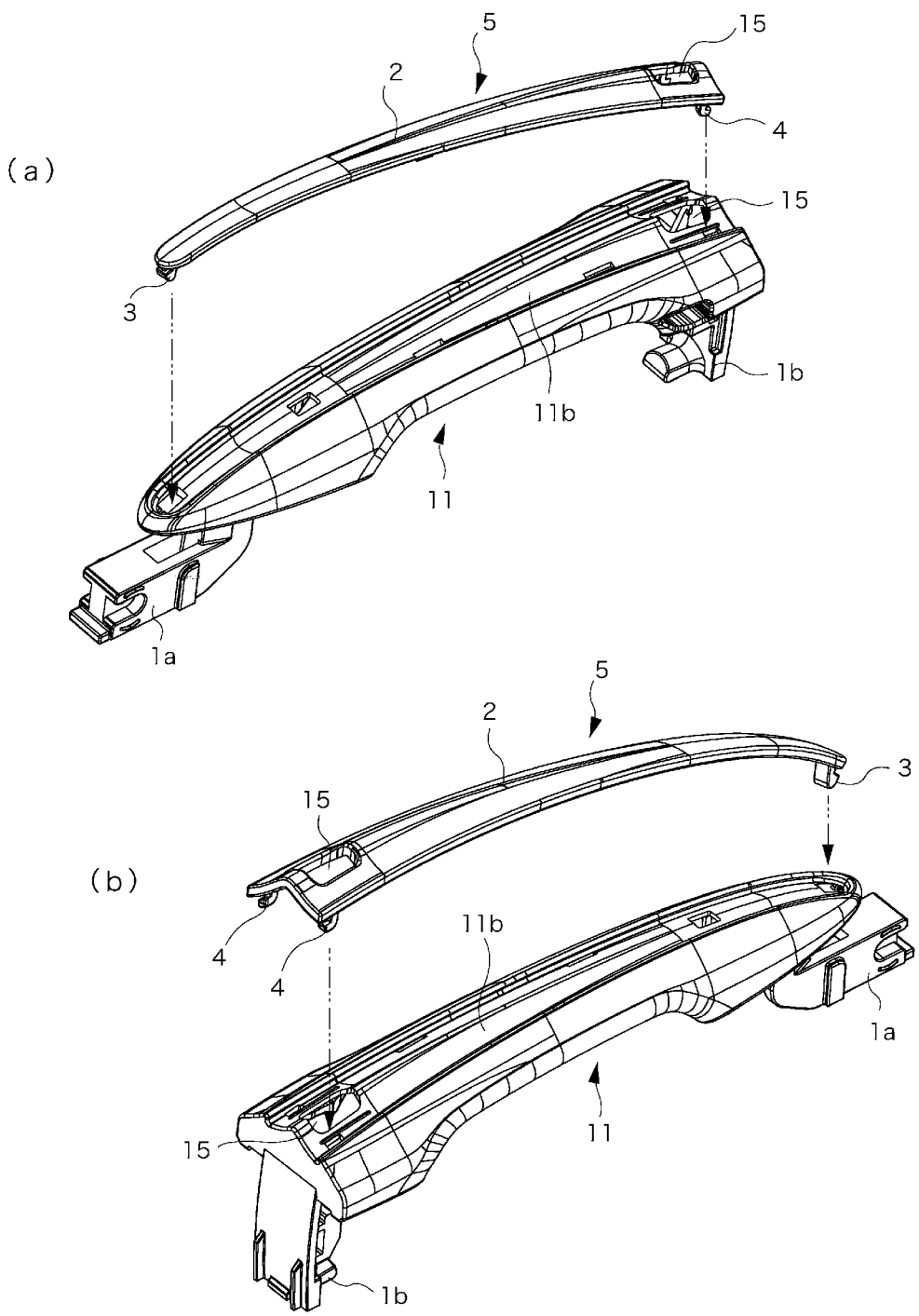
FIG. 3 is an exploded perspective view of a vehicular handle, Part (a) is a view as seen obliquely from the front, and Part (b) is a view as seen obliquely from the rear.
Figure 4:
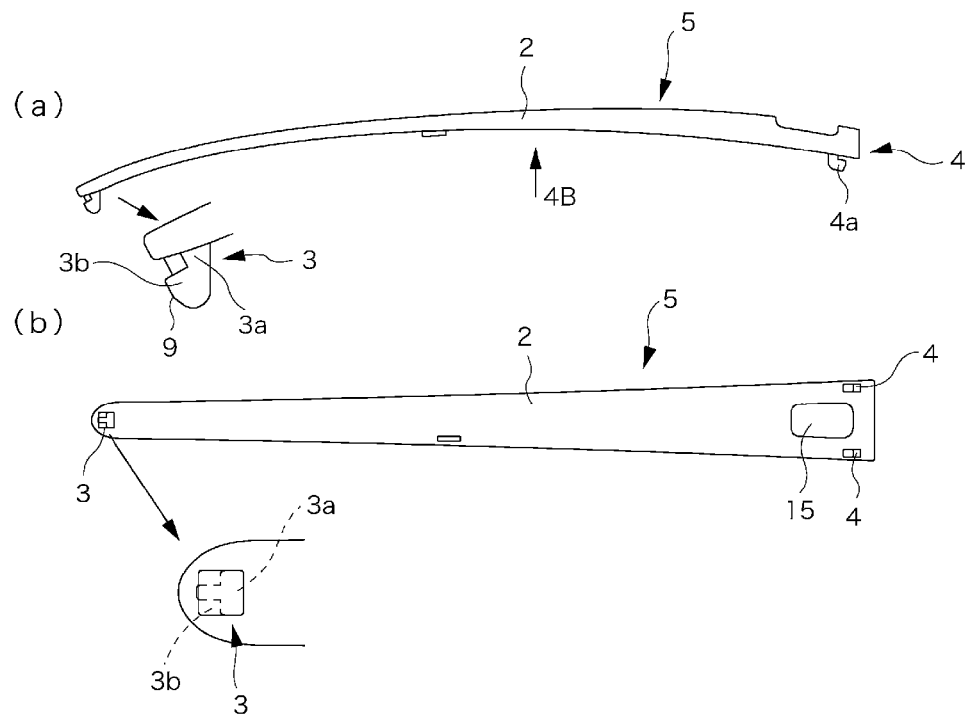
FIG. 4 is a view illustrating the decorative cover, Part (a) is a side view, and Part (b) is a view taken in the direction of arrow 4B of Part (a).

As illustrated in FIGS. 3 and 4, the decorative cover 5 is made of a material excellent in elasticity, such as a synthetic resin, and is formed with its length dimension in a longitudinal direction of the handle body 1, and a surface of the upper side cover 11 is provided with a fitting recess portion 11b for fitting the decorative cover 5. Also, switch openings 15 for exposing the push button 14 of the above-mentioned push switch 6B are formed in the decorative cover 5 and the upper side cover 11.

As illustrated in FIG. 3, the decorative cover 5 has a cross-sectional configuration having the shape of a flat plate extending from the front end portion to an intermediate portion and gradually assuming a "V" shape extending from the intermediate portion to the rear end portion, and likewise, a surface of the fitting recess portion 11b of the above-described handle body 1 is formed in a shape raised in a central portion above a flat surface, extending from the intermediate portion to the rear end portion.

Figure 2:
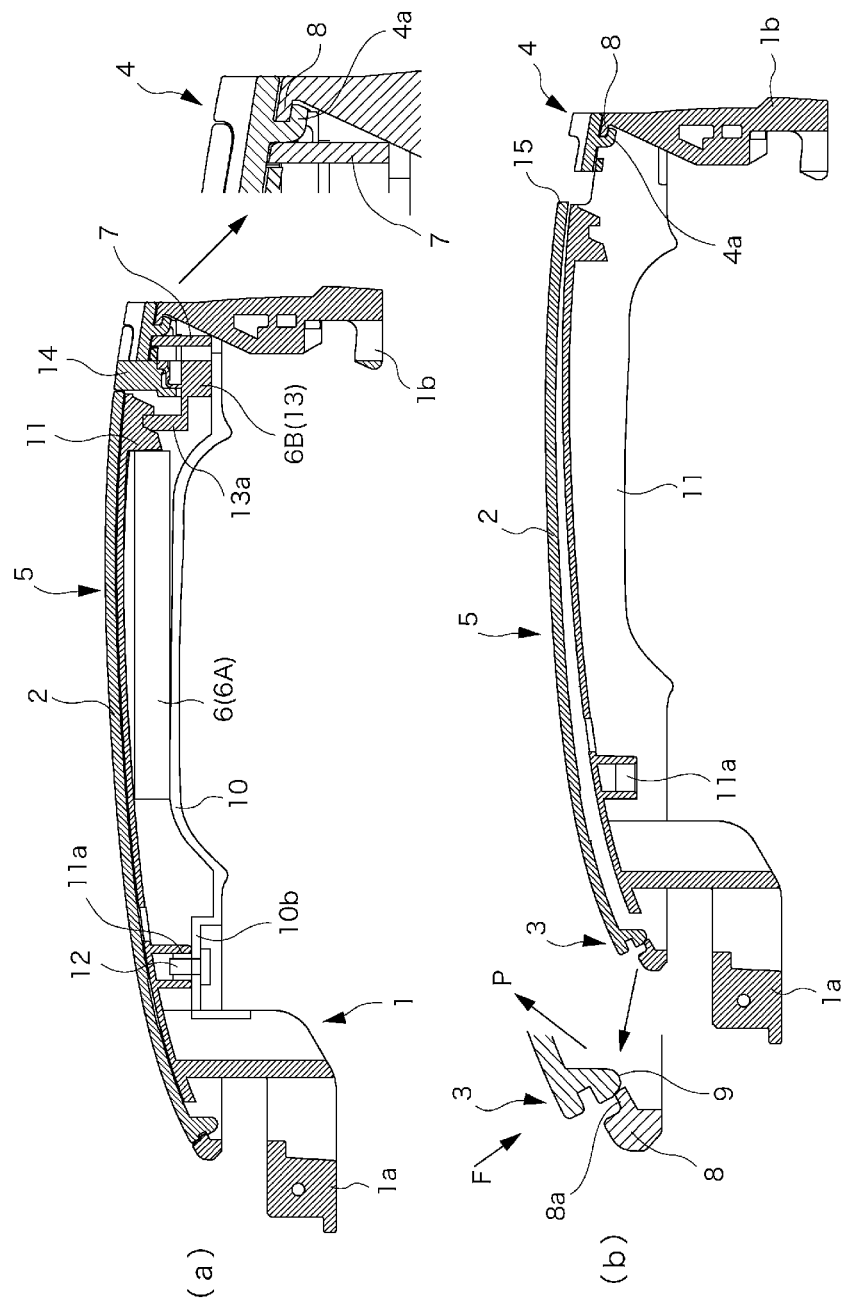
FIG. 2 is a cross-sectional view of FIG. 1, Part (a) is a cross-sectional view taken along line 2A-2A of Part (a) of FIG. 1, and Part (b) is a cross-sectional view illustrating a decorative cover as resiliently locked.

End portions of a main body portion 2 of the decorative cover 5 formed as described above are provided with locking portions 3, 4, respectively. As illustrated in FIG. 4, the locking portion 4 arranged in the rear end portion is formed in a hook shape and is provided with a locking piece 4a protruding rearward, and a pair of the locking portions 4 are arranged in side edge portions. As illustrated in FIG. 2, a locked portion 8 to which the locking pieces 4a are lockable is formed on the upper side cover 11, and, as illustrated in Part (b) of FIG. 2, the main body portion 2 can be turned around the locking portion 4 by locking the locking pieces 4a to the locked portion 8.

Further, as illustrated in FIG. 4, the locking portion 3 arranged in the front end portion of the above-described decorative cover 5 is formed in a hook shape and is provided with a locking piece 3b protruding frontward from a support post portion 3a. An inclined surface 9 is formed on a tip end of the locking portion 3, and the inclined surface 9 produces a component force in a buckling direction of the main body portion 2 when receiving a reaction force that a projecting piece 8a applies against a force to bring the inclined surface 9 into pressure contact with the projecting piece 8a of the locked portion 8 to be described later.

Also, the locking portion 3 is divided into three regions in a width direction by the support post portion 3a extending frontward in the central portion, and has a small dimension of locking by the locking piece 3b of the locking portion 3 in the central portion.

Figure 5:
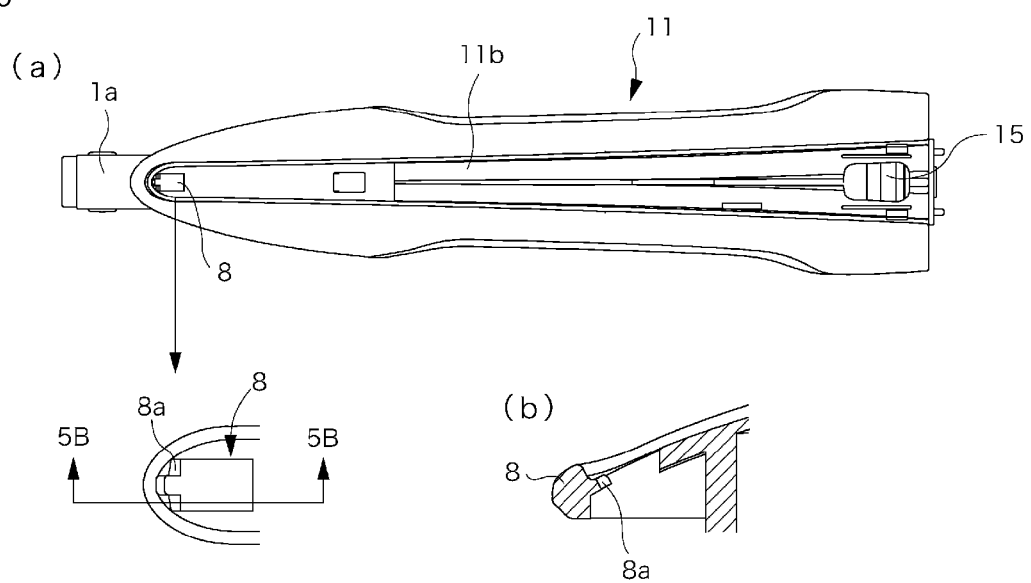
FIG. 5 is a view illustrating an upper side cover, Part (a) is a front view, and Part (b) is a cross-sectional view taken along line 5B-5B of Part (a).

Meanwhile, the upper side cover 11 is provided with the locked portion 8 for adaptation to the locking portion 3 in the front end portion of the above-described decorative cover 5. As illustrated in FIG. 5, the locked portion 8 is formed by the plate-shaped projecting piece 8a protruding rearward. In the projecting piece 8a, a projecting dimension is set short in the central portion and long at its ends for adaptation to the locking portion 3 of the decorative cover 5.

In the embodiment, therefore, as illustrated in Part (b) of FIG. 2, attachment of the decorative cover 5 is performed by turning the main body portion 2 counterclockwise around a locking location with the locking piece 4a of the locking portion 4 on the rear end side locked, and the inclined surface 9 formed on the locking portion 3 in the front end portion abuts against the locked portion 8 of the upper side cover 11 by turning of the main body portion 2.

In this state, when a pressing operation force (F) is applied to a tip end portion of the main body portion 2, a component force (P) in the buckling direction is produced in the main body portion 2 by the action of the inclined surface 9, as illustrated in Part (b) of FIG. 2. By the component force (P), the curvedly formed main body portion 2 is slightly and elastically warped in a direction in which the curvature of a curve becomes small, the locking portion 3 extends over and beyond the projecting piece 8a, and then, the locking portion 3 is locked to the locked portion 8 by elastic recovery of the main body portion 2.

Further, in order to increase linkage strength of the decorative cover 5, movement of the locking portion 4 is restrained by a movement restraining portion 7 as illustrated in Part (a) of FIG. 2. In the embodiment, by utilizing the assembly of the decorative cover 5 after the linkage thereof to the upper side cover 11, the movement restraining portion 7 is formed in the switch case 13 of the push switch 6B thereby to restrain a frontward movement of the locking portion 4 on the rear end side.

Arrangement of the movement restraining portion 7 prevents the locking portion 4 from moving frontward and being unlocked and thus improves the linkage strength, even if the locking portion 4 in the rear end portion is mischievously loaded by a frontward force. Also, the movement restraining portion 7 restrains the locking portion 4 from moving in a direction of turning, and therefore, even if the locking portion 3 on the front end side is loaded by a force which may move the locking portion 3 rearward, the overall decorative cover 5 is restrained from turning around a portion of locking of the locking portion 4 on the rear end side to the locked portion 8, thus rendering it difficult to remove the decorative cover 5.

EXPLANATION OF REFERENCE NUMERALS

1 HANDLE BODY
2 MAIN BODY PORTION
3, 4 LOCKING PORTIONS
5 DECORATIVE COVER
6 ELECTRONIC COMPONENT
7 MOVEMENT RESTRAINING PORTION
8 LOCKED PORTION
9 INCLINED SURFACE

The invention claimed is:

1. A vehicular handle comprising:
a handle body configured to be attached to a vehicle, the handle body including:
a first locked portion at a first end of the handle body;
a movement restraining portion adjacent the first locked portion; and
a second locked portion at a second end of the handle body; and
a decorative cover including a main body portion extending in a longitudinal direction of the handle body, the decorative cover including:
a first locking portion provided at a first end of the main body portion; and
a second locking portion provided at a second end of the main body portion; wherein
when the first locking portion is locked with the first locked portion, the movement restraining portion restrains movement of the first locking portion with respect to the first locked portion such that the first locking portion and the first locked portion define a turning fulcrum for the decorative cover to attach the decorative cover to the handle body.

2. The vehicular handle according to claim 1, further comprising an electronic component fixed to the handle body, and the movement restraining portion is mounted to the electronic component.

3. The vehicular handle according to claim 1, wherein, when the first locking portion is locked with the first locked portion, the first locking portion is in direct contact with the movement restraining portion and the first locked portion.

4. The vehicular handle according to claim 1, wherein the first locking portion has a hook shape configured to engage with the first locked portion.

5. A method of attaching a decorative cover to a handle body of a vehicular handle, the method comprising the steps of:
providing a handle body including a first locked portion at a first end of the handle body, a movement restraining portion adjacent the first locked portion, and a second locked portion at a second end of the handle body; and
attaching a decorative cover including a main body portion extending in a longitudinal direction of the handle body to the handle body, the decorative cover including a first locking portion provided at a first end of the main body portion and a second locking portion provided at a second end of the main body portion; wherein
the step of attaching the decorative cover further includes:
locking the first locking portion with the first locked portion such that the movement restraining portion restrains movement of the first locking portion with respect to the first locked portion; and
using the first locking portion and the first locked portion together as a turning fulcrum and turning the decorative cover about the turning fulcrum to attach the decorative cover to the handle body.

6. The method according to claim 5, wherein the vehicular handle includes an electronic component fixed to the handle body, and the movement restraining portion is mounted to the electronic component.

7. The method according to claim 5, wherein the step of locking the first locking portion with the first locked portion includes directly contacting the first locking portion with the movement restraining portion and the first locked portion.

8. The method according to claim 5, wherein the first locking portion has a hook shape, and the step of locking the first locking portion with the first locked portion includes hooking the first locking portion to the first locked portion.

9. The method according to claim 5, wherein the step of attaching the decorative cover includes elastically warping the main body portion to lock the second locking portion to the second locked portion.

10. The method according to claim 9, wherein at least one of the second locking portion and the second locked portion includes an inclined surface and, during the step of attaching the decorative cover, the inclined surface produces a component force to cause the elastic warping of the main body portion as the second locking portion is pressed into the second locked portion.

* * * * *